United States Patent
Yoshikawa

(10) Patent No.: US 7,079,274 B2
(45) Date of Patent: Jul. 18, 2006

(54) COMMUNICATION TERMINAL DEVICE

(75) Inventor: Hiroyasu Yoshikawa, Kyotanabe (JP)

(73) Assignee: Murata Kikai Kabushiki Kaisha, Kyoto (JP)

( * ) Notice: Subject to any disclaimer, the term of this patent is extended or adjusted under 35 U.S.C. 154(b) by 908 days.

(21) Appl. No.: 10/115,257

(22) Filed: Apr. 4, 2002

(65) Prior Publication Data
US 2002/0145754 A1 Oct. 10, 2002

(30) Foreign Application Priority Data
Apr. 9, 2001 (JP) ............... 2001-110040

(51) Int. Cl.
G06F 15/00 (2006.01)
(52) U.S. Cl. .............. 358/1.15; 358/434; 358/448
(58) Field of Classification Search ............. 358/1.12, 358/1.15, 407, 434, 442, 448; 700/2, 4
See application file for complete search history.

(56) References Cited

U.S. PATENT DOCUMENTS

| | | | |
|---|---|---|---|
| 5,042,028 A * | 8/1991 | Ogawa | 370/359 |
| 5,706,096 A * | 1/1998 | Koike | 382/239 |
| 6,154,286 A * | 11/2000 | Konno et al. | 358/1.13 |
| 6,304,342 B1 * | 10/2001 | Komada | 358/448 |
| 6,310,699 B1 * | 10/2001 | Kawasaki | 358/434 |
| 6,587,735 B1 * | 7/2003 | Yaguchi | 700/2 |

FOREIGN PATENT DOCUMENTS

| | | |
|---|---|---|
| JP | 5-14568 | 1/1993 |
| JP | 6-217049 | 8/1994 |
| JP | 6-217104 | 8/1994 |
| JP | 9-321994 | 12/1997 |
| JP | 9-326876 | 12/1997 |
| JP | 10-304101 | 11/1998 |
| JP | 10-327287 | 12/1998 |
| JP | 11-328376 | 11/1999 |
| JP | 2000-287005 | 10/2000 |
| JP | 2001-103317 | 4/2001 |

* cited by examiner

Primary Examiner—Mark Wallerson
(74) Attorney, Agent, or Firm—Westerman, Hattori, Daniels & Adrian, LLP.

(57) ABSTRACT

A communication terminal device by which it is possible to reduce the communication expenses, and to improve operational performance. The communication terminal device includes a CODEC circuit which has communication ability of a V.34 mode, is formed by a hardware, and codes and decodes image data. The communication terminal device includes a CODEC program which has the communication ability equal to or lower than a V.17 mode, and codes and decodes image data. When reading an image by an image reading unit and coding the image data by the CODEC circuit, or when decoding a coded image data by the CODEC circuit and printing the image of the image data by an image printing unit, if a calling demand for the communication is generated, a main control unit waits for processing completion of coding or decoding by the CODEC circuit, and starts the calling of the communication.

18 Claims, 2 Drawing Sheets

COMMUNICATION TERMINAL DEVICE

CROSS REFERENCES TO RELATED APPLICATIONS

This application claims priority under 35 USC 119 of Japanese Patent Application No. 2001-110040 filed in JPO on Apr. 9, 2001, the entire disclosure of which is incorporated herein by reference.

BACKGROUND OF THE INVENTION

1. Field of the Invention

The present invention relates to a communication terminal device such as a facsimile machine provided with codec (coder and decoder) means which differ from one another in communication ability.

2. Description of the Related Art

According to a facsimile machine of the conventional G3 mode, when carrying out facsimile communication by using V.34 method of the ITU-T Recommendation having a communication speed exceeding 14.4 kbps and lower than 28.8 kbps, it is necessary to code or decode image data by using a codec circuit formed by a hardware circuit. On the other hand, when carrying out the facsimile communication by using a method equal to or below V.17 method of the ITU-T Recommendation having a communication speed equal to or less than 14.4 kbps, the image data is coded or decoded by using a codec program of software stored in a storing device.

According to the conventional facsimile machine, in the case the facsimile machine comprises only one codec circuit formed by the hardware circuit, in addition to the codec program of the software, there were problems in that while the facsimile communication is being carried out, for example, an image cannot be read by an image reading unit and the image data cannot be coded to be stored into an image memory, or the image data within the image memory cannot be read and decoded to be printed out by an image printing unit.

Moreover, according to such a conventional facsimile machine, during scanning by the image reading unit or during printing by the image printing unit, when time reaches the scheduled time at which the registered transmission is to be carried out, even if the other end has the communication ability based on V.34 of the ITU-T Recommendation, the facsimile machine is required to carry out the facsimile communication by using the codec program of the software and by using the method having the communication speed equal to or lower than the communication speed of V. 17 of the ITU-T Recommendation. Therefore, compared with a required communication time in the case in which the facsimile communication is carried out by using the codec circuit formed by the hardware, the facsimile communication needs an especially long communication time, and accompanying this, there was a problem in that the communication expenses became excessive.

SUMMARY OF THE INVENTION

An object of the present invention is to provide a communication terminal device such as a facsimile machine by which the above-mentioned problems can be solved, and compared with the conventional facsimile machine, communication expenses can be reduced, and operational performance can be improved.

According to one aspect of the present invention, there is provided a communication terminal device including first codec means which codes and decodes the image data, and which has prescribed communication ability, second codec means which codes and decodes the image data, and which has the communication ability lower than the communication ability of the first codec means, image reading means for reading the prescribed image and converting it into the image data, and image printing means for printing the image of the image data. The communication terminal device further includes control means for starting the calling of the communication after waiting for the processing completion of the coding or the decoding by the first codec means, when the image is read by the image reading means and the image data is coded by the first codec, or when the coded image data is decoded by the first codec means and the image of the image data is printed by the image printing means, if the calling demand of the communication is generated.

Preferably, the first codec means is formed by a hardware circuit, and the second codec means is formed by a program of software stored in a storing device. Therefore, since the communication can be carried out under even faster communication speed, compared with the conventional facsimile machine, the communication expenses can be reduced, and the operational performance can be improved.

Moreover, in the communication terminal device, preferably, the control means starts the calling of the communication after waiting for the processing completion of the coding or the decoding by the first codec means, and carries out the coding of the image data by using the first codec means or the second codec means having the communication ability corresponding to the communication ability of the other end. Therefore, since the communication can be carried out under even faster communication speed, compared with the conventional facsimile machine, the communication expenses can be reduced, and the operational performance can be improved.

Furthermore, in the communication terminal device, when reading the image by the image reading means and coding the image data by the first codec means, or when decoding the coded image data by the first codec means and printing the image of the image data by the image printing means, if the calling demand of the communication is generated, in the case the mode for giving priority to the calling of the communication has been set, the coding of the image data is to be carried out by using the second codec means. Therefore, by setting the calling start priority mode for giving priority to the calling of the communication, the facsimile communication can be started instantly, and the operational performance can be improved.

Additional objects, aspects, benefits and advantages of the present invention will become apparent to those skilled in the art to which the present invention pertains from the subsequent detailed description and the appended claims, taken in conjunction with the accompanying drawings.

DETAILED DESCRIPTION OF THE INVENTION

An embodiment of the present invention will now be described in reference to the accompanying drawings.

Figure 1:
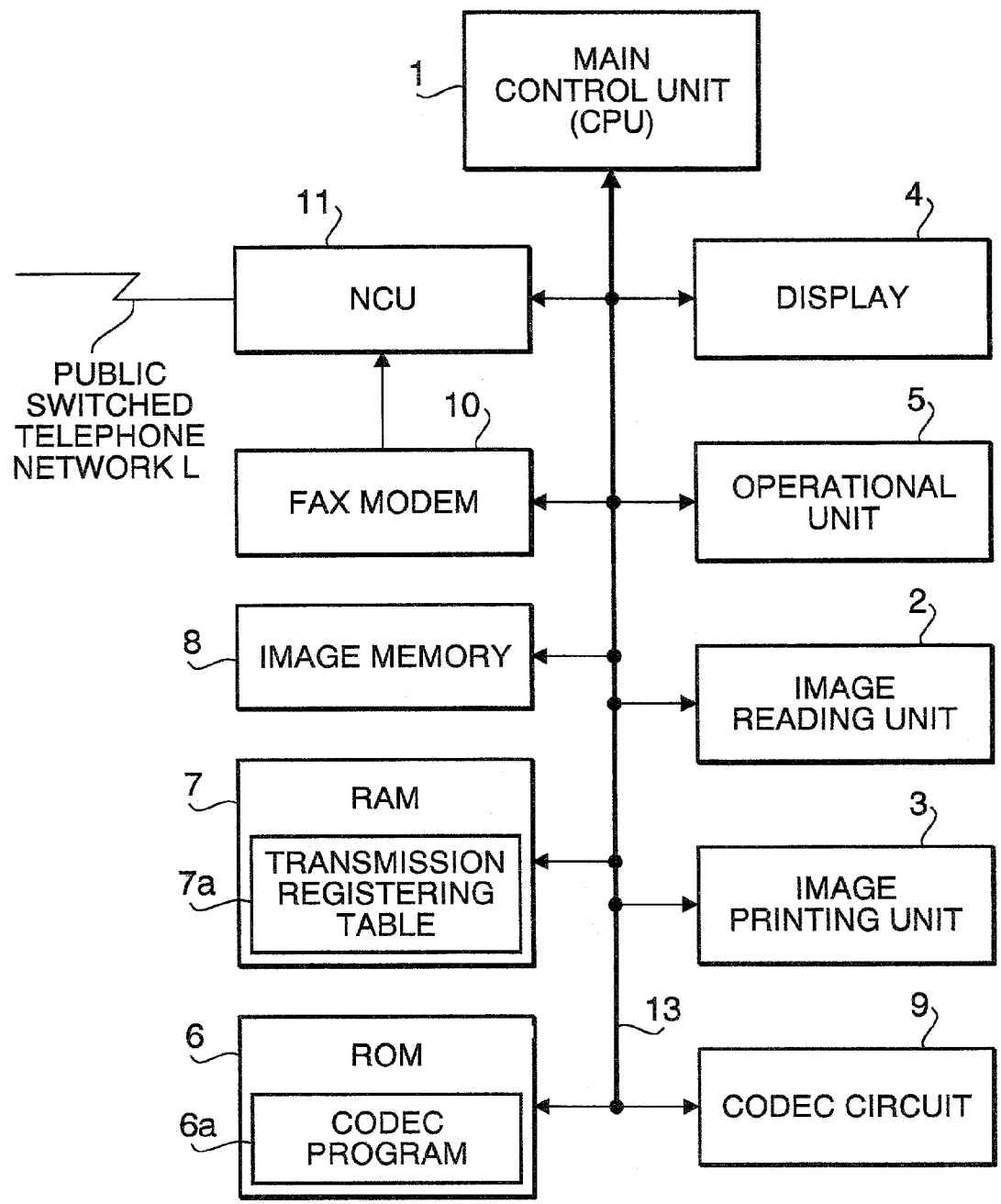
FIG. 1 is a block diagram showing the structure of a facsimile machine 20 comprising a CODEC circuit 9 and a CODEC program 6a according to an embodiment of the present invention.

As shown in FIG. 1, a facsimile machine 20 has a CODEC circuit 9 and CODEC program 6a.

According to the embodiment if the present invention, the facsimile machine 20 includes the CODEC circuit 9 which has the communication ability of V.34 mode of the ITU-T Recommendation, is formed by the hardware, and codes and decodes the image data. The facsimile machine 20 further includes the CODEC program 6a which has the communication ability lower than the communication ability of the CODEC circuit 9, i.e., has the communication ability equal to or lower than V.17 mode of the ITU-T recommendation. The CODEC program 6a is provided within a ROM (Read Only Memory) 6, and is formed by software for coding and decoding image data. Moreover, when reading an image by an image reading unit 2 and coding the image data by the CODEC circuit 9, or when decoding coded image data by the CODEC circuit 9 and recoding the image of the image data by an image printing unit 3, if a calling demand of the communication is generated (or if there is a calling demand of communication), a main control unit 1 waits for the processing completion of the coding or the decoding by the CODEC circuit 9, and starts the calling of the communication (step S2).

Moreover, the main control unit 1 starts the calling of the communication by waiting until the processing of the coding or the decoding of the CODEC circuit 9 is completed, and carries out the coding of the image data to be transmitted by using the CODEC circuit 9 or the CODEC program 6a having the communication ability corresponding to the communication ability of the other end (step S2, S7, S5, S8). In other words, out of the CODEC circuit 9 and the CODEC program 6a, either which corresponds to the communication ability of the machine of the other end is used for coding the image data to be transmitted. Furthermore, when the image is read by the image reading unit 2 and the image data is coded by the CODEC circuit 9, or when the coded image data is decoded by the CODEC circuit 9 and the image of the image data is printed by the image printing unit 3, if the calling demand of the communication is generated (YES in step S2), and the calling start priority mode for giving priority to the calling of the communication has been set (YES in step S3), the communication of the image data is carried out by using the CODEC program 6a (step S5).

In FIG. 1, the facsimile machine 20 is provided with the facsimile communication function of the conventional G3 method or the like, and also comprises the CODEC circuit 9 of the hardware having the communication ability of V.34 mode of the ITU-T Recommendation, and the CODEC program 6a within the ROM 6 having the communication ability equal to or lower than the V.17 mode of the ITU-T Recommendation. The main control unit 1 is formed by a CPU (Central Processing Unit) specifically, is connected to the following hardware units via a bus 13 to control each of the units, and carries out the function of various software to be mentioned later on. The image reading unit 2 reads the original such as a document by a scanner using CCD (charged coupled device) or the like, and outputs dotted image data converted into a binary of black and white. The image printing unit 3 is a printer device of an electrophotographic method or the like, and prints the image data received by the facsimile communication from other facsimile machines by printing out the image data as a hard copy. A display 4 is a displaying device such as a liquid crystal display (LCD) or a cathode ray tube display (CRT), and displays the operational state of the facsimile machine 20 or displays the image data of the original to be transmitted and the received image data.

An operational unit 5 comprises various keys necessary for operating the facsimile machine 20 such as letter keys, ten-key numeric pad for dialing, speed dialing keys, one-touch dial keys, and other various function keys. Further, by making the display 4 to be a touch paneled type, it can be constructed to substitute for a part of or all of the various keys of the operational unit 5.

The ROM 6 stores in advance programs of various software which is necessary for the operation of the facsimile machine 20, and the programs are carried out by the main control unit 1. The programs have the communication ability based on the V.17 mode, the V.32, the V.27ter, the V.26bis, or the like of the ITU-T Recommendation, and include the CODEC program 6a which carries out the coding and the decoding of the image data and also the program for the transmission processing shown in FIG. 2. A RAM (Random Access Memory) 7 is formed by an SRAM, a flash memory or the like, is used as a working area of the main control unit 1, and stores temporary data generated when carrying out the program. A transmission registering table 7a is stored in the RAM 7, and the transmission registering table 7a stores data such as transmission time (including immediate transmission), transmission destination, an address in the image memory 8 of the image data to be transmitted (i.e., at this address in the image memory 8, the image data to be transmitted is stored), and the like concerning each facsimile transmission, for example, immediate transmission or transmission whose transmission time is designated. Further, when a flash memory is used as the RAM 7, the contents of the data are not lost even in the case the power source is shut off due to, for example, power failure or transferring of the device. The image memory 8 is formed by a DRAM or the like, and stores the image data to be transmitted or the received image data. Further, the RAM 7 and the image memory 8 can be formed by a hard disk memory.

The faxmodem 10 is connected to a public switched telephone line L, is a modem having a function of a faxmodem for the general facsimile communication, demodulates the data of the calling telephone number information which is received as an FSK signal, and outputs the data to the main control unit 1. An NCU (Network Control Unit) 11 is a hardware circuit which carries out the closing and releasing operation of a direct current loop or the like of the analogue public switched telephone line L, has an automatic dialing function, and connects the faxmodem 10 to the public switched telephone line L when necessary. The NCU 11 carries out the detection of the ID receiving terminal starting signal in the caller ID notification service, carries out the detection of the normal telephone calling signal, and is capable of transmitting a first response signal and a second response signal in the caller ID notification service when necessary. Further, the NCU 11 can be connected to a digital line of a base band transmission method (for example, ISDN line) via a prescribed terminal adaptor and a DSU (Digital Service Unit).

The facsimile machine 20 of the embodiment of the present invention which is formed in the manner stated above comprises the CODEC circuit 9 and the CODEC program 6a in addition to the facsimile communication function of the general G3 method or the like. In the facsimile communication function, the dotted image data read by the image reading unit 2 is coded by the CODEC program 6*a* within the ROM 6 or the CODEC circuit 9 following the coding method such as MH, MR, and MMR which are defined in the standard for the facsimile communication, and then transmitted to the facsimile machine of the other end. On the other hand, the coded data received from the facsimile machine of the other end is decoded into the image data by the CODEC program 6*a* within the ROM 6 or the CODEC circuit 9, and then is output as the hard copy from the image printing unit 3. Further, the image memory 8 stores the image data when necessary, and also outputs the stored image data when necessary.

Furthermore, it will be described of a communication procedure of the V.34 mode and the V.8 mode which are capable of high speed data communication such as the high speed facsimile communication. In the case of carrying out the data communication by the communication terminal device such as the facsimile machine, a device to be used is a modem based on the communication procedure of a half duplex method, such as the V.17 mode of the ITU-T Recommendation, and such data communication is to be carried out following the procedure defined in the ITU-T Recommendation T. 30 which is also the facsimile communication procedure of the G3 standard. Moreover, a super speed communication procedure based on the V.34 of the ITU-T Recommendation (hereafter referred to as the communication procedure of the V.34 mode) has been put into a practical use. According to this super speed communication procedure, the highest transmission speed is 33.6 kbps. In such a communication procedure of the V.34 mode, when starting the communication or while the communication is being carried out, the receiving side can specify the communication speed in accordance with the network condition at that time, specifically S/N (ratio of signal to noise power), and/or the bandwidth, and the transmitting side changes the communication speed so that the transmission is to be carried out under the communication speed specified by the receiving side. Further, in the case of carrying out the data communication by the communication procedure of the V.34 mode, the actual communication speed is determined by carrying out the preceding procedure by the V.8 communication procedure of the ITU-T Recommendation.

The faxmodem 10 used in the embodiment of the present invention is a modem which is capable of carrying out the communication procedure of the V.34 mode. The faxmodem 10 is also capable of changing the communication speed while the communication is being carried out, and enables monitoring, from the outside, of the condition of the communication network at that time based on the signal received from the other end, specifically, monitoring of S/N and the data of the bandwidth as a status. In other words, the line probing processing is carried out between the device of the receiving side and the device of the transmitting side, and as a result of such processing, S/N and the bandwidth of the line at that time are output as a status from the faxmodem 10, and the main control unit 1 reads out such a status, and carries out the processing based on the status.

Figure 2:
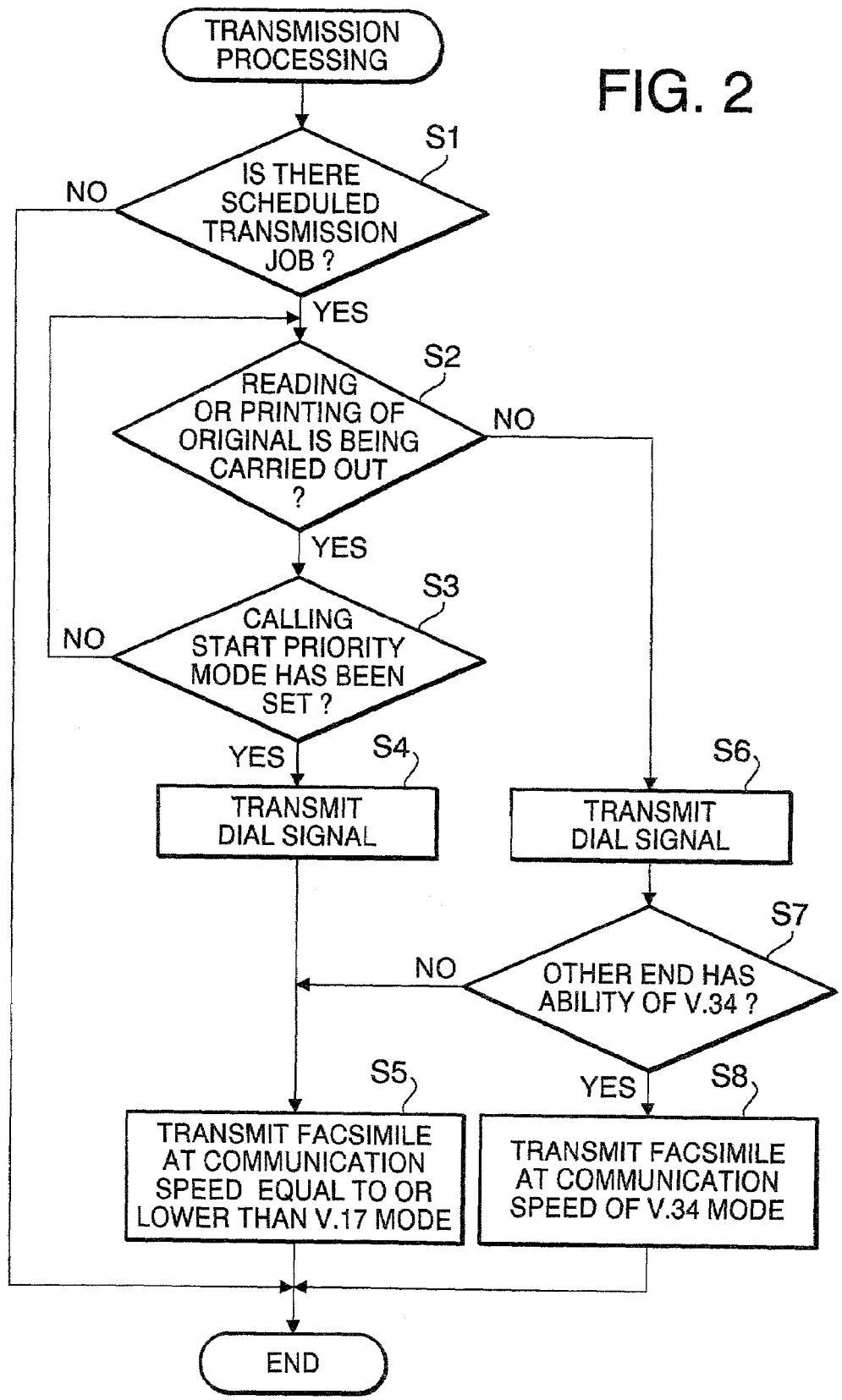
FIG. 2 is a flow chart showing the transmission processing to be carried out by a main control unit 1 shown in FIG. 1.

In FIG. 2, first in step S1, it is judged whether or not there is a scheduled transmission job by referring to the transmission registering table 7*a* (or whether or not a calling demand is generated). When YES is selected in step S1, the procedure proceeds to step S2, and on the other hand, when NO is selected, the transmission processing is terminated. Next, in step S2, it is judged whether or not reading of the original by the image reading unit 2 or printing by the image printing unit 3 is being carried out (or it is judged whether or not reading of an image by the image reading unit to code the read image by the CODEC circuit or decoding of image data by the CODEC circuit to print an image of the decoded image data by the image printing unit is being carried out). When YES is selected in step S2, the procedure proceeds to step S3, and on the other hand, when NO is selected, the procedure proceeds to step S6. Furthermore, in step S3, it is judged whether or not the calling start priority mode has been set which is a mode for giving priority to the calling of the communication. When YES is selected in step S3, the procedure proceeds to step S4, and on the other hand, when NO is selected, the procedure returns to step S2. In step S4, the main control unit 1 causes the facsimile machine 20 to transmit the dial signal including the telephone number of the destination (when the calling of the communication is started, the dial signal is transmitted), and then in step S5, the facsimile is transmitted at the communication speed equal to or lower than the V.17 mode, and the transmission processing is completed.

On the other hand, when NO is selected in step S2, the procedure proceeds to step S6, and the main control unit 1 causes the facsimile machine 20 to transmit the dial signal including the telephone number of the destination, and in step S7, it is judged whether or not the machine of the other end has the ability of the V 34. When YES is selected in step S7, the procedure proceeds to step S8, and on the other hand, when NO is selected in step S7, the procedure proceeds to step S5. In step S5, the facsimile is transmitted at the communication speed equal to or lower than the V.17 mode in the manner stated above, and then the transmission processing is completed. On the other hand, in step S8, the facsimile is transmitted at the communication speed of the V.34 mode, and then the transmission processing is completed.

As in the manner stated above, according to the embodiment of the present invention, the communication terminal device comprises the CODEC circuit 9 formed by the hardware, and the CODEC program 6*a*. When the image is read by the image reading unit 2 and the image data is coded by the CODEC circuit 9, or when the coded image data is decoded by the CODEC circuit 9 and the image of the image data is printed by the image printing unit 3, if the calling demand of the communication is generated, the main control unit 1 waits until the processing of the coding or the decoding by the CODEC circuit 9 is completed, and starts the calling of the communication (step S2). Therefore, since the communication can be carried out at a faster communication speed, compared with the conventional facsimile machine, the communication expenses can be reduced and the operational performance can be improved.

Moreover, the main control unit 1 waits for the processing completion of the coding and the decoding of the CODEC circuit 9, starts the calling of the communication, and carries out the coding of the image data to be transmitted by using the CODEC circuit 9 or the CODEC program 6*a* having the communication ability corresponding to the communication ability of the other end (step S2, S7, S5, S8). Therefore, the communication can be carried out at even faster communication speed, and as a result, compared with the conventional facsimile machine, the communication expenses can be reduced, and the operational performance can be improved.

Furthermore, when the image is read by the image reading unit 2 and the image data is coded by the CODEC circuit 9, or when the coded image data is decoded by the CODEC circuit 9 and the image of the image data is printed by the image printing unit, if a calling demand of the communication is generated (YES in step S2), in the case the calling start priority mode has been set for giving priority to the calling of the communication (YES in step S3), the main control unit 1 carries out the communication of the image data by using the CODEC program 6a (step S5). Therefore, by setting the calling start priority mode for giving priority to the calling of the communication, the facsimile communication can be started instantly, and the operational performance can be improved.

In the embodiment described above, an example of the facsimile machine 20 is described. However, the present invention is not to be limited to such a case, and can be applied to the communication terminal devices including, for example, a telephone set and a data communication terminal which are connected to a public network such as a public switched telephone network or a public digital line network.

What is claimed is:

1. A communication terminal device, comprising:
   first codec means for coding and decoding image data, the first codec means having prescribed communication ability;
   second codec means for coding and decoding image data, the second codec means having communication ability lower than the prescribed communication ability of the first codec means;
   image reading means for reading a prescribed image and converting the read image into image data;
   image printing means for printing an image of image data; and
   control means for starting calling of communication,
   wherein when the image is read by the image reading means and the converted image data is coded by the first codec means, or when coded image data is decoded by the first codec means and an image of the decoded image data is printed by the image printing means, if a calling demand of communication is generated, the control means starts calling of the communication after waiting for processing completion of the coding or the decoding by the first codec means, and
   wherein when the image is read by the image reading means and the converted image data is coded by the first codec means, or when the coded image data is decoded by the first codec means and the image of the decoded image data is printed by the image printing means, if the calling demand of the communication is generated and a mode for giving priority to calling of communication has been set, the second codec means is used for coding image data to be transmitted.

2. The communication terminal device according to claim 1,
   wherein the first codec means is formed by a hardware circuit, the communication terminal device further includes a storing device, and the second codec means is formed by a program of software stored in the storing device.

3. The communication terminal device according to claim 1, wherein the control means starts the calling of the communication after waiting for the processing completion of the coding or the decoding by the first codec means, and out of the first codec means and the second codec means, either which has communication ability corresponding to a machine of the other end is used for coding image data to be transmitted.

4. The communication terminal device according to claim 1,
   further including a faxmodem capable of changing a communication speed at the time communication is started, or while communication is being carried out.

5. The communication terminal device according to claim 1,
   wherein when the control means starts the calling of the communication, the control means causes the communication terminal device to transmit a dial signal including a telephone number of a machine of the other end.

6. A communication terminal device, comprising:
   first codec means for coding and decoding image data, the first codec means having prescribed communication ability;
   second codec means for coding and decoding image data, the second codec means having communication ability lower than the prescribed communication ability of the first codec means;
   image reading means for reading a prescribed image and converting the read image into image data;
   image printing means for printing an image of image data; and
   control means for starting calling of communication,
   wherein when the image is read by the image reading means and the converted image data is coded by the first codec means, or when coded image data is decoded by the first codec means and an image of the decoded image data is printed by the image printing means, if a calling demand of communication is generated, the control means starts calling of the communication after waiting for processing completion of the coding or the decoding by the first codec means, and
   wherein when the image is read by the image reading means and the converted image data is coded by the first codec means, or when the coded image data is decoded by the first codec means and the image of the decoded image data is printed by the image printing means, if the calling demand of the communication is generated and a mode for giving priority to calling of communication has been set, the control means does not wait for the processing completion of the coding or the decoding by the first codec means, and starts the calling of the communication.

7. The communication terminal device according to claim 6,
   wherein in a case in which the control means does not wait for the processing completion of the coding or the decoding by the first codec means, and starts the calling of the communication, the control means causes the communication terminal device to transmit a dial signal including a telephone number of a machine of the other end.

8. The communication terminal device according to claim 7,
   wherein after the control means causes the communication terminal device to transmit the dial signal, the control means codes image data to be transmitted by using the second codec means, and causes the communication terminal to transmit the coded image data.

9. The communication terminal device according to claim 8,
   wherein the control means causes the communication terminal device to transmit the coded image data at a communication speed equal to or lower than a V.17 mode.

10. A communication terminal device, comprising:
first codec means for coding and decoding image data, the first codec means having prescribed communication ability;
second codec means for coding and decoding image data, the second codec means having communication ability lower than the prescribed communication ability of the first codec means;
image reading means for reading a prescribed image and converting the read image into image data;
image printing means for printing an image of image data; and
control means for starting calling of communication,
wherein when the image is read by the image reading means and the converted image data is coded by the first codec means, or when coded image data is decoded by the first codec means and an image of the decoded image data is printed by the image printing means, if a calling demand of communication is generated, the control means starts calling of the communication after waiting for processing completion of the coding or the decoding by the first codec means,
wherein when the control means starts the calling of the communication, the control means causes the communication terminal device to transmit a dial signal including a telephone number of a machine of the other end, and
wherein after the communication terminal device transmits the dial signal, if the machine of the other end has ability of a V.34 mode, the control means codes image data to be transmitted by using the first codec means, and causes the communication terminal device to transmit the coded image data.

11. The communication terminal according to claim 10, wherein after the communication terminal device transmits the dial signal, if the machine of the other end has the ability of the V.34 mode, the control means codes the image data to be transmitted by using the first codec means, and causes the communication terminal device to transmit the coded image data by facsimile at a communication speed of the V.34 mode.

12. A communication terminal device, comprising:
first codec means for coding and decoding image data, the first codec means having prescribed communication ability;
second codec means for coding and decoding image data, the second codec means having communication ability lower than the prescribed communication ability of the first codec means;
image reading means for reading a prescribed image and converting the read image into image data;
image printing means for printing an image of image data; and
control means for starting calling of communication,
wherein when the image is read by the image reading means and the converted image data is coded by the first codec means, or when coded image data is decoded by the first codec means and an image of the decoded image data is printed by the image printing means, if a calling demand of communication is generated, the control means starts calling of the communication after waiting for processing completion of the coding or the decoding by the first codec means,
wherein when the control means starts the calling of the communication, the control means causes the communication terminal device to transmit a dial signal including a telephone number of a machine of the other end, and
wherein after the communication terminal device transmits the dial signal, if the machine of the other end does not have ability of a V.34 mode, the control means codes the image data to be transmitted by using the second codec means, and causes the communication terminal device to transmit the coded image data.

13. The communication terminal device according to claim 12,
wherein after the communication terminal device transmits the dial signal, if the machine of the other end does not have the ability of the V.34 mode, the control means codes the image data to be transmitted by using the second codec means, and causes the communication terminal device to transmit the coded image data by facsimile at a communication speed equal to or lower than a V.17 mode.

14. A communication method in a communication terminal device including first codec means having prescribed communication ability and including second codec means having communication ability lower than the prescribed communication ability of the first codec means, said method comprising the steps of:
(a) judging whether or not reading of an image by the device to code the read image by the first codec means or decoding of image data by the first codec means to print an image of the decoded image data is being carried out, when a calling demand is generated;
(b) starting calling of communication after waiting for processing completion of the first codec means if in the step (a), it is judged that reading of the image by the device to code the read image by the first codec means or decoding of the image data by the first codec means to print the image of the decoded image data is being carried out; and
(c) judging whether or not a machine of the other end has communication ability of a V.34 mode after in the step (b), the calling of the communication is started,
wherein if in the step (c), it is judged that the machine of the other end has communication ability of a V.34 mode, image data to be transmitted is coded by the first codec means, and the coded image data is transmitted.

15. The communication method according to claim 14, wherein in a case in which if in the step (c), it is judged that the machine of the other end has the communication ability of the V.34 mode, the image data to be transmitted is coded by the first codec means, and the coded image data is transmitted at a communication speed of the V.34 mode.

16. The communication method according to claim 14, wherein if in the step (c), it is judged that the machine of the other end does not have the communication ability of the V.34 mode, the image data to be transmitted is coded by the second codec means, and the coded image data is transmitted.

17. The communication method according to claim 16, wherein if in the step (c), it is judged that the machine of the other end does not have the communication ability of the V.34 mode, the image data to be transmitted is coded by the second codec means, and the coded image data is transmitted at a communication speed equal to or lower than a V.17 mode.

18. A communication method in a communication terminal device including first codec means having prescribed communication ability and including second codec means having communication ability lower than the prescribed communication ability of the first codec means, said method comprising the steps of:

(a) judging whether or not reading of an image by the device to code the read image by the first codec means or decoding of image data by the first codec means to print an image of the decoded image data is being carried out, when a calling demand is generated;

(b) starting calling of communication after waiting for processing completion of the first codec means if in the step (a), it is judged that reading of the image by the device to code the read image by the first codec means or decoding of the image data by the first codec means to print the image of the decoded image data is being carried out; and (d) judging whether or not a mode for giving priority to calling of communication has been set, if in the step (a), it is judged that reading of the image by the device to code the read image by the first codec means or decoding of the image data by the first codec means to print the image of the decoded image data is being carried out, wherein if in the step (d), it is judged that the mode for giving priority to calling of communication has been set, the calling of the communication is started without waiting for the processing completion of the first codec means, image data to be transmitted is coded by using the second codec means, and the coded image data is transmitted at a communication speed equal to or lower than a V.17 mode.

* * * * *